United States Patent
Jiang et al.

(10) Patent No.: US 6,212,405 B1
(45) Date of Patent: Apr. 3, 2001

(54) EXTENDED RANGE CONCENTRIC CELL BASE STATION

(75) Inventors: Frances Jiang, Whippany; Wen-Yi Kuo, Parsippany, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/143,666

(22) Filed: Aug. 31, 1998

(51) Int. Cl.[7] .................. H04B 1/38; H04Q 7/20
(52) U.S. Cl. ............... 455/561; 455/443; 455/444; 455/446; 455/448; 370/337
(58) Field of Search ................... 455/561, 562, 455/443, 422, 444, 446, 448, 500; 370/337, 336, 347, 328, 334, 342, 335

(56) References Cited

U.S. PATENT DOCUMENTS

| | | | |
|---|---|---|---|
| 3,913,017 | * 10/1975 | Imaseki | 455/434 |
| 5,103,459 | 4/1992 | Gilhousen | 375/1 |
| 5,541,979 | * 7/1996 | Leslie et al. | 455/436 |
| 5,544,171 | * 8/1996 | Godecker | 455/561 |
| 5,551,060 | * 8/1996 | Fujii et al. | 455/562 |
| 5,615,215 | * 3/1997 | Utting et al. | 370/337 |
| 5,640,677 | * 6/1997 | Karlsson | 455/434 |
| 5,740,166 | * 4/1998 | Ekemark et al. | 370/331 |
| 5,825,764 | * 10/1998 | Rudolph | 370/337 |
| 5,831,974 | * 11/1998 | Suonvieri | 370/252 |
| 6,047,181 | * 4/2000 | Suonvieri | 455/440 |

FOREIGN PATENT DOCUMENTS

| | | | |
|---|---|---|---|
| 0 653 893 A1 | 11/1994 | (EP) | H04Q/7/20 |
| 0 687 079 A2 | 6/1995 | (EP) | H04B/7/26 |
| WO 5/02306 | 7/1993 | (WO) | H04Q/7/26 |
| WO 4/07322 | 9/1993 | (WO) | H04M/11/00 |

* cited by examiner

Primary Examiner—Reinhard Eisenzopf
Assistant Examiner—Duc Nguyen
(74) Attorney, Agent, or Firm—Jimmy Goo

(57) ABSTRACT

The present invention is a extended range concentric cell base station and a method for extending a cell size or access range without incurring ASIC correlator re-design. This is accomplished with a concentric cell base station design that incorporates multiple timing protocols. The concentric base station has associated a micro cell and a macro cell, wherein the micro and macro cells use a different timing protocol that will cause signals transmitted by mobiles within their respective cells to be received within the confines of search windows associated with the timing protocols.

11 Claims, 7 Drawing Sheets

EXTENDED RANGE CONCENTRIC CELL BASE STATION

CROSS REFERENCE TO RELATED APPLICATION

Related subject matter is disclosed in the following application filed concurrently herewith and assigned to the same Assignee hereof: U.S. patent application Ser. No. 09/143,665 entitled "Handoffs In Extended Range Concentric Cell Base Station," inventors Frances Jiang, Wen-Yi Kuo and Raafat Kamel.

FIELD OF THE INVENTION

The present invention relates generally to wireless communications systems and, in particular, to extending access ranges of wireless communications systems.

BACKGROUND OF THE INVENTION

FIG. 1 depicts a wireless communications system 10 employing Code Division Multiple Access (CDMA) techniques based on the well-known IS-95 standard of the Telecommunication Industrial Association. The wireless communications system 10 comprises a mobile switching center (MSC) 12 and a plurality of base stations (BS) 14-$i$ connected to the MSC 12. Each of BS 14-$i$ provides wireless communications services to mobile-telephones (MT), such as mobile-telephones 16-$k$, within an associated geographical coverage area referred to herein as cell 18-$i$ with a radius $R_i$. For illustrative purposes, cells 18-$i$ are depicted as circular in shape with base stations 14-$i$ centrally positioned. It should be understood that cells 18-$i$ may also be non-circular in shape (e.g., hexagonal) with the base stations positioned non-centrally, and that the term "radius $R_i$" should be construed to define a distance between the base station and a point on the circumference of cell 18-$i$ (which will vary depending on the particular point on the circumference).

Each base station 14-$i$ includes radios and antennas for modulating and transmitting base station signals to mobile-telephones, and for receiving and demodulating mobile-telephone signals from mobile-telephones within its associated cell 18-$i$. Each base station 14-$i$ further includes a receiver for receiving timing information using the well-known Global Positioning Satellites (hereinafter referred as a "GPS receiver").

Signals are transmitted by base stations 14-$i$ and mobile-telephones in accordance with a timing protocol aligned with GPS time using the GPS receiver. FIG. 2 depicts a timing schedule 20 incorporating an implementation of a timing protocol based on the IS-95 standard. The timing schedule 20 comprises a series of frames 22-$n$, wherein each frame 22-$n$ spans a time interval t. The beginning of each frame 22-$n$ is marked by a frame boundary at time $T_n$ aligned to GPS time. In accordance with the timing protocol, base stations 14-$i$ are configured to begin transmitting base station signals at the frame boundaries, wherein the base station signals include zero or more information bearing signals and a pilot signal for coherent demodulation of the information bearing signals by the mobile-telephones and system access operations. By contrast, mobile-telephones 16-$k$ are configured to begin transmitting mobile-telephones signals at some multiple x of a frame time period (i.e., tx) after mobile-telephones 16-$k$ began receiving base station signals, where x is some integer greater than or equal to zero. Unlike base station signals, mobile-telephone signals include one or more information bearing signals and no pilot signal, and are encoded using a set of orthogonal codes (referred to as Walsh codes) combined with a pseudo-noise (PN) sequence (or a known code) such that the information bearing signal may be non-coherently demodulated. The PN sequence comprises random 0 and 1 digital signals, wherein the duration for a 0 or 1 to transmit is referred to herein as a PN chip.

The above described timing protocol will now be discussed in reference to FIG. 3, which depicts a time chart 28 illustrating a sequence of transmissions and receptions by base station 14-$i$ and mobile-telephone 16-$k$. At time $T_1$, BS 14-$i$ begins transmitting base station signal $S_1$ to MT 16-$k$, which may be located anywhere in cell 18-$i$. MT 16-$k$ begins receiving signal $S_1$ at time $T_1 + d_{BS \to MT}$, where $d_{BS \to MT}$ is a propagation delay from BS 14-$i$ to MT 16-$k$. Note that the term propagation delay shall be construed to include line-of-sight and non-line-of-sight propagation delays.

MT 16-$k$ will wait a time interval tx from when MT 16-$k$ began receiving signal $S_1$ before it begins transmitting mobile-telephone signal $S_2$. Thus, MT 16-$k$ will begin transmitting signal $S_2$ at time $T_1 + d_{BS \to MT} + tx$ (or time $d_{BS \to MT}$ after some frame boundary). For example, if x=2, then MT 16-$k$ transmits signal $S_2$ at time $T_3 + d_{BS \to MT}$ (or two frames after receiving the base station signal $S_1$).

Due to a propagation delay $d_{MT \to BS}$ from MT 16-$k$ to BS 14-$i$, BS 14-$i$ will begin receiving signal $S_2$ at time $T_1 + d_{BS \to MT} + tx + d_{MT \to BS}$. For ease of discussion, it is assumed that the propagation delay $d_{MT \to BS}$ from MT 16-$k$ to BS 14-$i$ is the same as the propagation delay $d_{BS \to MT}$, and both will hereinafter be referred to individually as a one way propagation delay $d_{ow}$, i.e., $d_{ow} = d_{MT \to BS} = d_{BS \to MT}$, or collectively as a round trip propagation delay $2d_{ow}$. Thus, BS 14-$i$ will begin receiving signal $S_2$ at time $T_1 + tx + 2d_{ow}$.

In order to demodulate the received signal $S_2$, BS 14-$i$ must first detect signal $S_2$. Each radio includes a correlator, which is a device that detects mobile-telephone signals. For example, the correlator detects mobile-telephone signal $S_2$ by multiplying an incoming signal by the PN sequence, where the PN sequence is time shifted in discrete steps over a period or time interval (referred to herein as a search window $W_n$) until the resulting product (of the PN sequence and the incoming signal) exceeds a threshold indicating the detection of mobile-telephone signal $S_2$. If BS 14-$i$ does not begin to receive signal $S_2$ within the confines of a search window $W_n$, BS 14-$i$ will not be able to detect signal $S_2$ (using the timing protocol incorporated in FIG. 2).

To ensure that BS 14-$i$ begins receiving signal $S_2$ within the confines of search windows $W_n$, search windows $W_n$ should span time intervals that include possible arrival times for signal $S_2$ (traveling a straight line or line-of-sight path between the mobile-telephone and the base station) regardless of the position of mobile-telephone 16-$k$ in cell 18-$i$. Based on the above described timing protocol, base station 14-$i$ can expect to receive signal $S_2$ no earlier than the frame boundary and no later than time $2d_{ow\text{-}radius}$ after the frame boundary, where $d_{ow\text{-}radius}$ is the one way propagation delay (or $2d_{ow\text{-}radius}$ is the round trip propagation delay) for a signal traveling a distance equal to the radius $R_i$. Thus, search windows $W_n$ should span a duration of at least $2d_{ow\text{-}radius}$ beginning at time $T_n$ and ending no earlier than time $T_n + 2d_{ow\text{-}radius}$. In effect, the duration of search windows $W_n$ restricts the effective radius (or size) of cell 18-$i$, which is also referred to herein as the access range of a base station.

The duration of search windows $W_n$ depends on the implementation of the correlator. Typically, correlators are implemented in the form of an Application Specific Integrated Circuit (hereinafter referred to as an "ASIC correlator") having a predetermined number of bits (also referred to herein as a "bit limitation") for representing a round trip delay (of a signal traveling from the base station to the mobile-telephone and back to the base station). Such bit limitation limits the duration of the search windows which, as discussed above, limits the effective size of cell 18-$i$ or access range of the base station 14-$i$. As long as the bit limitation does not limit search windows $W_n$ to a duration of less than $2d_{ow-radius}$, base station 14-$i$ should be able to detect signal $S_2$ transmitted by any mobile-telephone located anywhere within its cell 18-$i$ (assuming that $R_i$ is the same for all points on the circumference).

Typical implementations of base stations in an IS-95 based CDMA wireless communications system include an ASIC correlator having a 12-bit limitation for representing the round trip delay. In order to have fine resolution of delay, a typical value of 1/8 PN chip is used as the minimum resolution unit. The 12-bit limitation (or round trip delay representation) in units of 1/8 PN chips yields a range of 512 PN chips (i.e., $2^{12}$ bits×1/8 PN chips/bits). For a transmit bandwidth of 1.2288 MHz (which is typical for an IS-95 based CDMA wireless communications system), the 12-bit limitation can represent a round trip delay of 416 $\mu$s (i.e., 512 PN chips÷1.2288 PN chips/$\mu$s). With air propagation speed of 5.33 $\mu$s/mile, the 416 $\mu$s round trip delay (or 208 $\mu$s one way delay) represents the limitation that if a mobile-telephone is located approximately 39 miles (i.e., 208 $\mu$s÷5.33 $\mu$s/mile) from the base station, the mobile-telephone is capable of communicating with the base station if the radio path loss is acceptable and the search window is configured correctly—that is, the 12-bit limitation (or 512 time chip delay index representation) allows for a cell with a maximum radius $R_i$ (or a maximum round trip delay) of approximately 39 miles. A signal transmitted by a mobile-telephone beyond 39 miles of BS 14-$i$, in accordance with the prior art timing protocol, may not arrive at BS 14-$i$ within the confines of any search windows $W_n$ and, thus, will not be reliably detectable with the 12-bit ASIC correlator.

Presently, if the cell size or access range is to be extended beyond the 12-bit limitation of the ASIC correlator (i.e., beyond 39 miles), the ASIC correlator would have to be re-designed. Specifically, the ASIC correlator would have to be re-designed to increase its bit limitation such that signals transmitted by mobile-telephones positioned beyond the access range 12-bit limitation of the ASIC correlator may also be detected. ASIC correlator re-design, however, is undesirable and may not be economical for small scale of applications. Therefore, there exist a need to extend the cell size or access range of the base station without incurring the high costs associated with ASIC correlator re-design.

SUMMARY OF THE INVENTION

The present invention is an extended range concentric cell base station and a method for extending a cell size or access range without incurring ASIC correlator re-design. This is accomplished with a concentric cell base station design that incorporates multiple timing protocols. The concentric base station has associated a micro cell and a macro cell, wherein the micro and macro cells use a different timing protocol that will cause signals transmitted by mobile-telephones within their respective cells to be received within the confines of search windows associated with the timing protocols. In one embodiment, the micro cell uses the timing protocol of the prior art and the macro cell uses a modified timing protocol that will cause the search window and/or base station transmission time to shift with respect to frame boundaries. Specifically, the modified timing protocol involves transmitting base station signals at some time q and q+p before search windows begin and end, respectively, wherein q represents a timing advance value and p represents a time interval corresponding to the ASIC correlator bit limitation.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
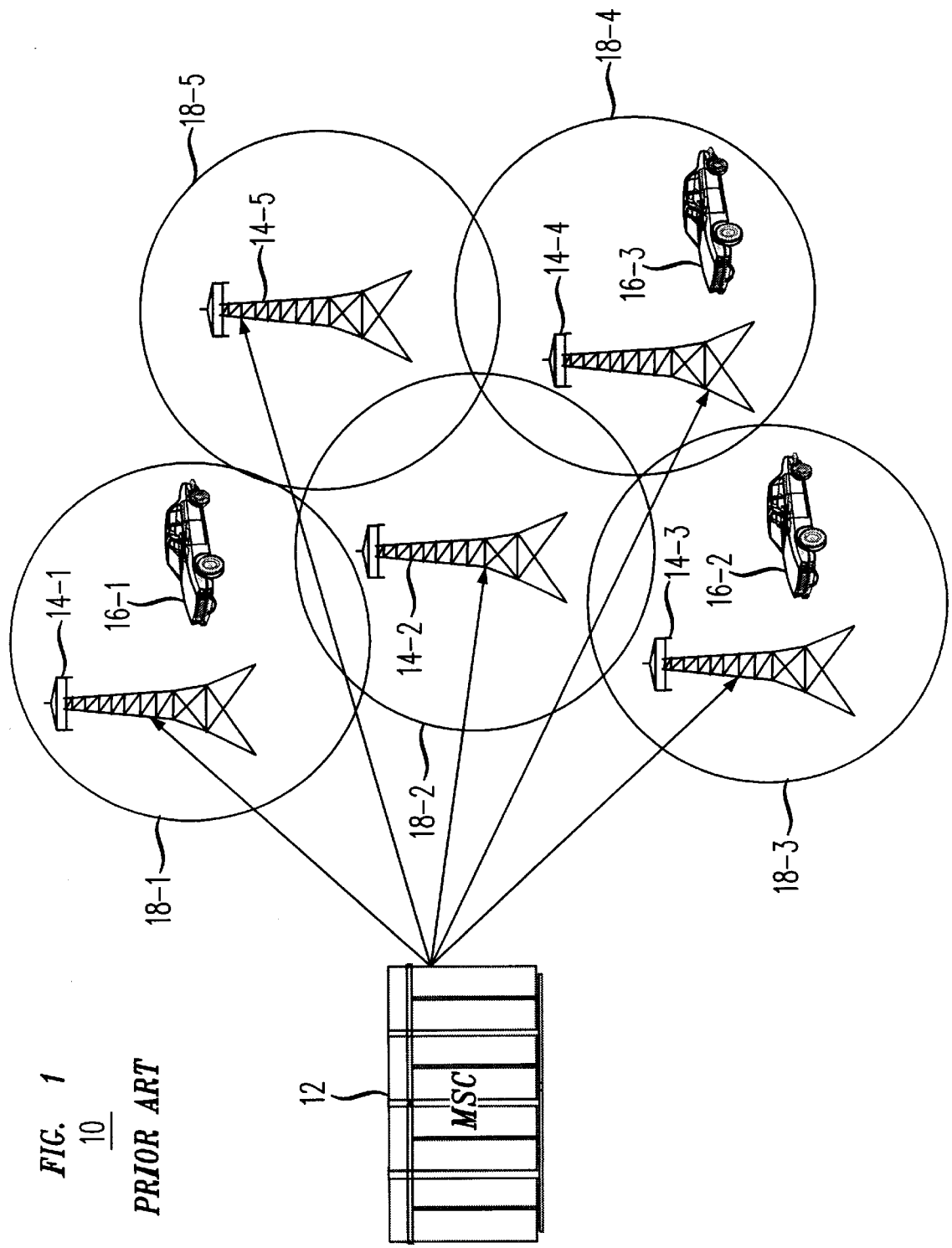
FIG. 1 depicts a wireless communications system employing Code Division Multiple Access (CDMA) techniques based on the well-known IS-95 standard.
Figure 2:
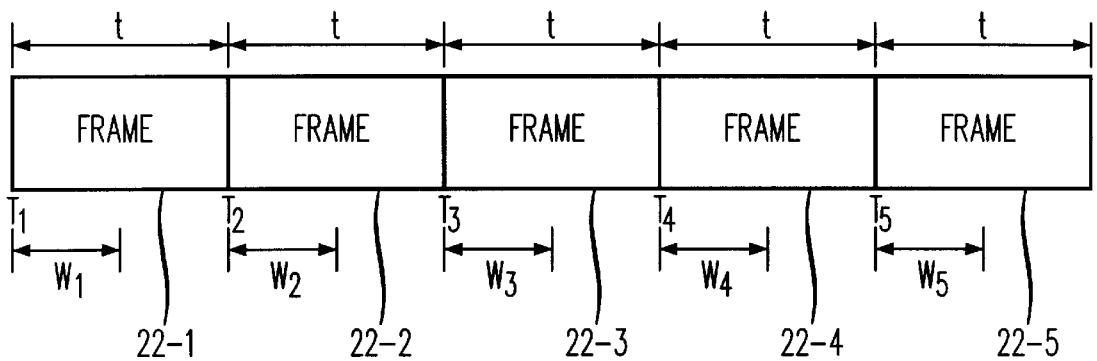
FIG. 2 depicts a timing schedule used in accordance with one implementation of a timing protocol based on the IS-95 standard.
Figure 3:
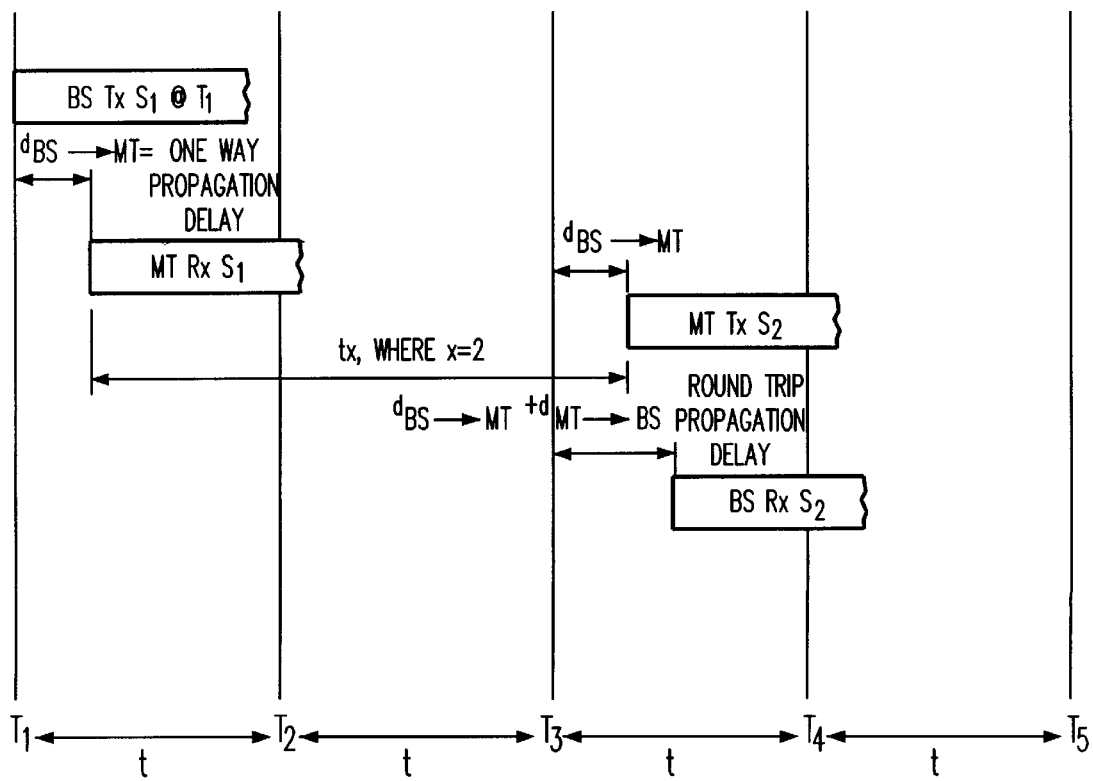
FIG. 3 depicts a time chart illustrating a sequence of transmissions and receptions by base station and mobile-telephone in accordance with the timing schedule of FIG. 2.
Figure 4:
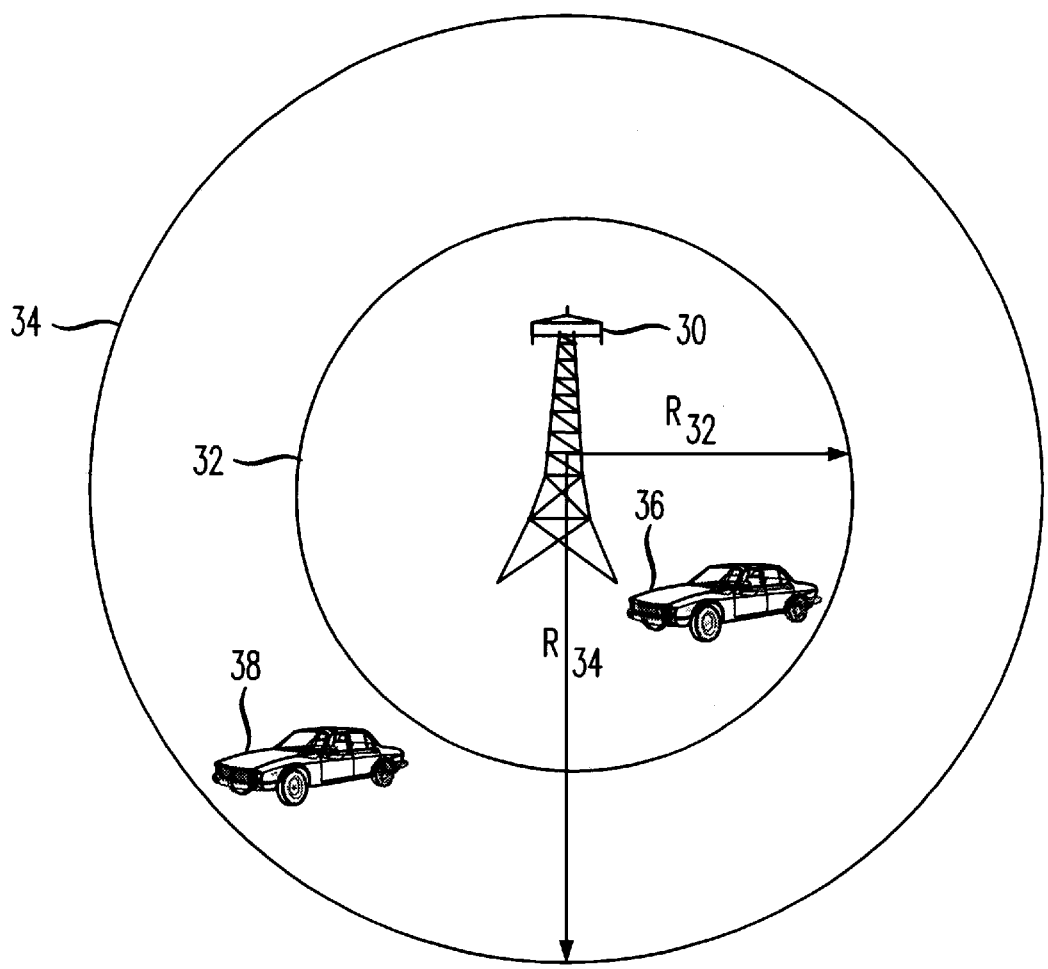
FIG. 4 depicts a base station based on the well-known IS-95 standard for Code Division Multiple Access used in accordance with the present invention.

FIG. 4 depicts a base station 30 based on the well-known IS-95 standard for Code Division Multiple Access used in accordance with the present invention. Base station 30 includes radios and antennas for modulating and transmitting base station signals to mobile-telephones and for receiving and demodulating mobile-telephone signals from mobile-telephones within cell 34, and a GPS receiver for receiving timing information using the well-known Global Positioning Satellites. Each radio includes a correlator implemented in the form of an ASIC (hereinafter referred to as an "ASIC correlator") operable to detect mobile-telephone signals such that the mobile-telephone signals may be demodulated.

For purposes of discussion, the ASIC correlator has a 12-bit limitation (or 512 PN chips) for representing a round trip delay (of a signal traveling from base station 30 to a mobile-telephone and back to base station 30), as described in the background section. This should not be construed to limited the present invention to ASIC correlators with 12-bit limitations. It will be clear to one of ordinary skill in the art that the present invention is equally applicable to base stations having ASIC correlators with other bit limitations or correlators implemented in a form other than an ASIC. A 12-bit (or 512 PN chips) ASIC correlator has a search window $W_n$ of approximately 416 µs in duration. In prior art CDMA wireless communications systems using a timing protocol based on the IS-95 standard, such search window $W_n$ is configured to begin at time $F_n$ (marking the beginning of frames) and end at time $F_n$+416 µs, and would allow base station 30 to detect a signal transmitted from mobile-telephones located within approximately 39 miles of base station 30. Thus, a mobile-telephone beyond 39 miles of base station 30 would be considered beyond the access range of base station 30 equipped with a 12-bit ASIC correlator.

Cell 34 has an outer radius $R_{outer}$ (or $R_{34}$) and an inner radius $R_{inner}$ (or $R_{32}$), wherein outer radius $R_{outer}$ may be or is a distance beyond the access range of the ASIC correlator bit limitation (e.g., $R_{outer}$>39 miles for an ASIC correlator with a 12-bit limitation), inner radius $R_{inner}$ is less than $R_{outer}$, and the difference $\Delta R$ between radii $R_{outer}$ and $R_{inner}$ should be no greater than the distance (or maximum round trip delay) corresponding to the ASIC correlator bit limitation (e.g., $\Delta R \leq 39$ miles). Thus, part of cell 34 may be beyond the access range of the ASIC correlator bit limitation, in accordance with the subject invention.

The present invention allows base station 30 to detect signals transmitted from mobile-telephones located anywhere in cell 34, including beyond the access range of its ASIC correlator bit limitation (e.g., beyond 39 miles), without ASIC correlator re-design. The present invention is accomplished using a modified timing protocol that will cause search windows and/or base station transmission times to shift with respect to frame boundaries, thereby causing signals transmitted by mobile-telephones positioned beyond the bit limitation of the ASIC correlator to be received within the search windows. This involves transmitting a base station signal at a time r relative to frame boundaries and configuring search windows $W_n$ to begin and end at a time q and q+p, respectively, after the time r, wherein q is a timing advance value greater than zero for representing a propagation delay corresponding to a signal traveling no more than round trip between the base station and the inner radius of cell 34 (i.e., q corresponds to a propagation delay for a distance greater than zero but no more than twice inner radius $R_{inner}$) and p represents a time interval corresponding to the ASIC correlator bit limitation or a time interval over which a mobile-telephone signal may be correlated and thereby detected.

Figure 5:
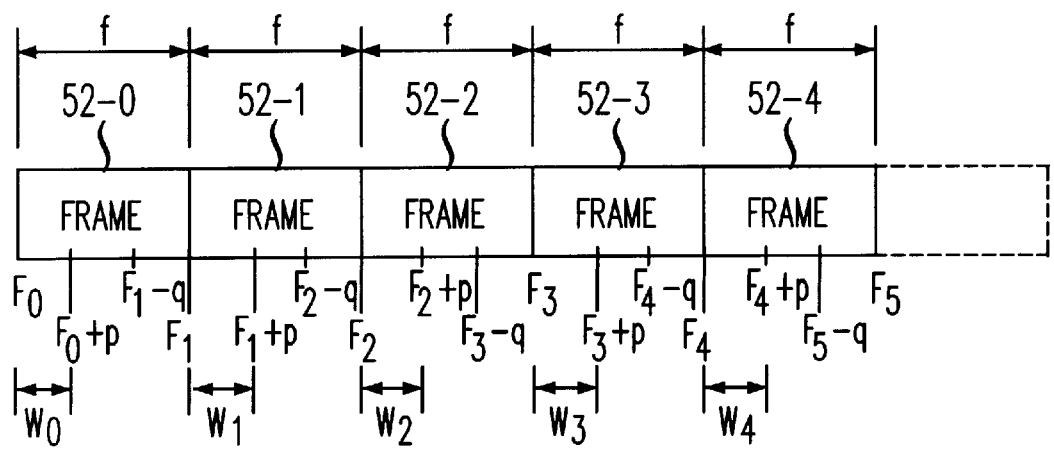
FIG. 5 depicts a timing schedule for a timing protocol used in accordance with one embodiment of the present invention.

In one embodiment, the present invention uses a modified timing protocol incorporating a timing advance technique. FIG. 5 illustrates a timing schedule 50 for a timing protocol used in accordance with this embodiment of the present invention. The timing schedule 50 includes a series of frames 52-n, wherein each frame 52-n spans a time interval f, and the beginning of each frame 52-n is marked by a frame boundary at time $F_n$ aligned with GPS time using the GPS receiver. In accordance with this modified timing protocol, base station 30 is configured to begin transmitting base station signals at time q before the frame boundaries (i.e., at times $F_n$-q), and search for mobile-telephone signals within search windows $W_n$ spanning from time $F_n$ and ending no later than time $F_n$+p. Likewise, mobile-telephone 38 is configured to begin transmitting signals at some multiple x of a frame time interval (i.e., fx) after the mobile-telephones began receiving base station signals, where x is some integer greater than or equal to zero.

Figure 6:
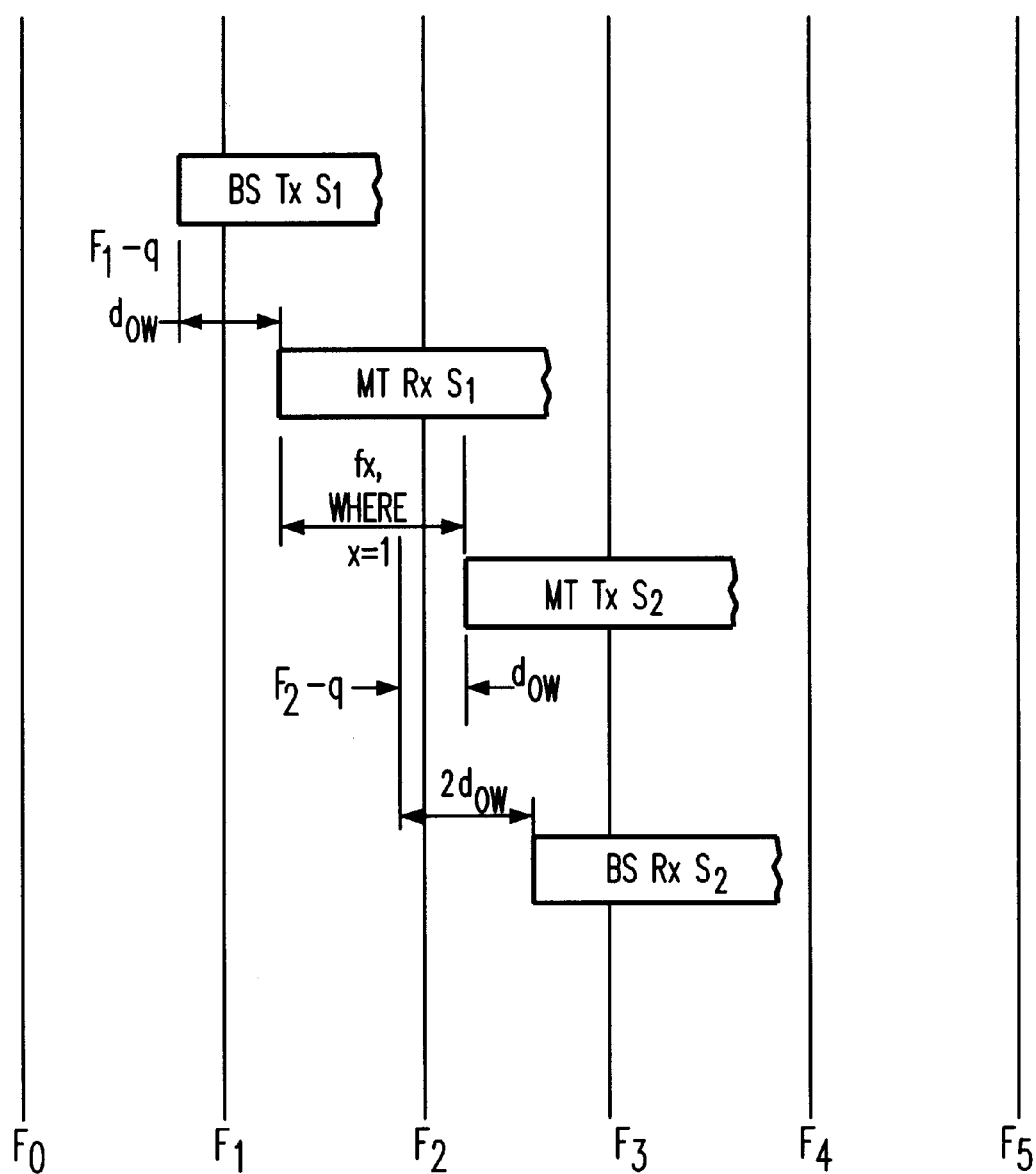
FIG. 6 depicts a time chart illustrating a sequence of transmissions and receptions by a base station and a mobile-telephone located within an extension of a cell.

FIG. 6 depicts a time chart 60 illustrating a sequence of transmissions and receptions in accordance with the timing protocol of FIG. 5 by base station 30 and mobile-telephone 38, which may be located anywhere within cell 34. Base station 30 begins transmitting base station signal $S_1$ at time $F_1$-q. Mobile-telephone 38 begins receiving signal $S_1$ at time $F_1$-q+$d_{ow}$, where dow is the one way propagation delay from base station 30 to mobile-telephone 38 (or from mobile-telephone 38 to base station 30). Note that for ease of discussion, the propagation delay from base station 30 to mobile-telephone 38 is assumed to be identical to the propagation delay from mobile-telephone 38 to base station 30. If mobile-telephone 38 transmits a mobile-telephone signal $S_2$ to base station 30, mobile-telephone 38 waits some multiple of a frame time interval (i.e., fx) from when mobile-telephone 38 began receiving signal $S_1$ before it begins transmitting signal $S_2$. Thus, mobile-telephone 38 will begin transmitting signal $S_2$ at some time $F_1$-q+$d_{ow}$+fx (or time $d_{ow}$-q after some frame boundary). Because of the propagation delay $d_{ow}$ from mobile-telephone 38 to base station 30, base station 30 will begin receiving signal $S_2$ at some time $F_1$-q+$d_{ow}$+fx+$d_{ow}$ (or $F_1$-q+2$d_{ow}$+fx), which positions the signals to be received between time $F_n$ (i.e., the frame boundary) and time $F_n$+p, where p416 µs corresponding to the ASIC correlator bit limitation (or within the confines of search windows $W_n$). Signal $S_2$ is then detected and processed using techniques well-known in the art. Thus, transmission of signal $S_1$ at time $F_n$-q by base station 30 will result in the reception of signals transmitted by mobile-telephones 38 within search windows $W_n$ such that the mobile-telephone signals may be detected and demodulated by base station 30 notwithstanding that mobile-telephone 38 is beyond the access range of the ASIC correlator bit limitation.

For example, suppose $R_{inner}$ equals 39 miles and $R_{outer}$ equals 78 miles, then $\Delta R$ equals 39 miles, which is equal to a distance corresponding to a 12 bit ASIC correlator limitation. In this example, base station 30 would begin transmitting at a time q=416 µs (i.e., 2×39 miles×5.33 µs/mile) before a frame boundary such that mobile-telephone signals may be received by base station 30 between time $F_n$ and $F_n$+p, where p=416 µs corresponding to the ASIC correlator bit limitation (or within the confines of search windows $W_n$).

In another example, suppose cell 34 has an inner radius $R_{inner}$ of 20 miles and an outer radius $R_{outer}$ of 48 miles. Thus, $\Delta R$ is equal to a distance of 28 miles. Since $\Delta R$ is less than 39 miles (or the distance corresponding to the limitation of the 12 bit ASIC correlator), the value of q may be between 96 µs (2×(48−39) miles×5.33 µs/mile) and 213.2 µs (i.e., 2×20 miles×5.33 µs/mile) to ensure or increase the probability that a signal transmitted by any mobile-telephone within cell 34 is received within the confines of search windows $W_n$ beginning at a frame boundary and ending at a time p=416 µs after the frame boundary.

Figure 7:
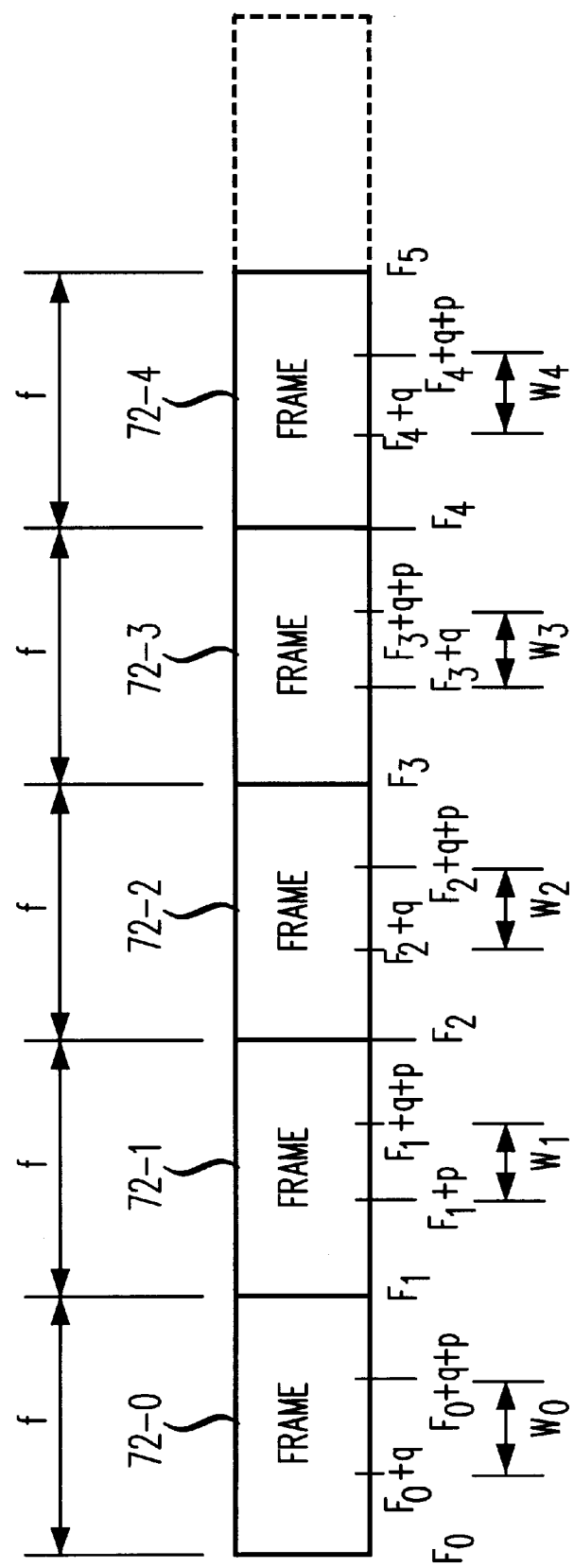
FIG. 7 depicts a timing schedule for a timing protocol used in accordance with another embodiment of the present invention.

In another embodiment of the present invention, base station 30 is operable to detect signals transmitted from mobile-telephone 38 using a modified timing protocol incorporating shifted or offset search windows $W_n$. FIG. 7 illustrates a timing schedule 70 for a timing protocol used in accordance with this embodiment of the present invention. In accordance with the timing schedule 70, base station 30 is configured to begin transmitting signals at the frame boundaries, and search for mobile-telephone signals within shifted search windows $W_n$ spanning from time $F_n$+q and ending no later than time $F_n$+q+p. Likewise, mobile-telephone 38 is configured to begin transmitting signals at some multiple x of a frame time interval (i.e., fx) after the mobile-telephones begin receiving base station signals. Like timing schedule 50, base station 30 using timing schedule 70 will begin to receive signals transmitted from mobile-telephone 38 within the (shifted) search window $W_n$.

It should be noted that a base station incorporating only the modified timing protocol of the present invention may not be able to detect mobile-telephone signals transmitted by mobile-telephones located within cell 32. To be capable of detecting such mobile-telephone signals, the present invention uses a timing protocol and a frequency band different from the timing protocol and frequency band being used to communicate with mobile-telephones located within cell 34, as will be described herein.

Figure 8:
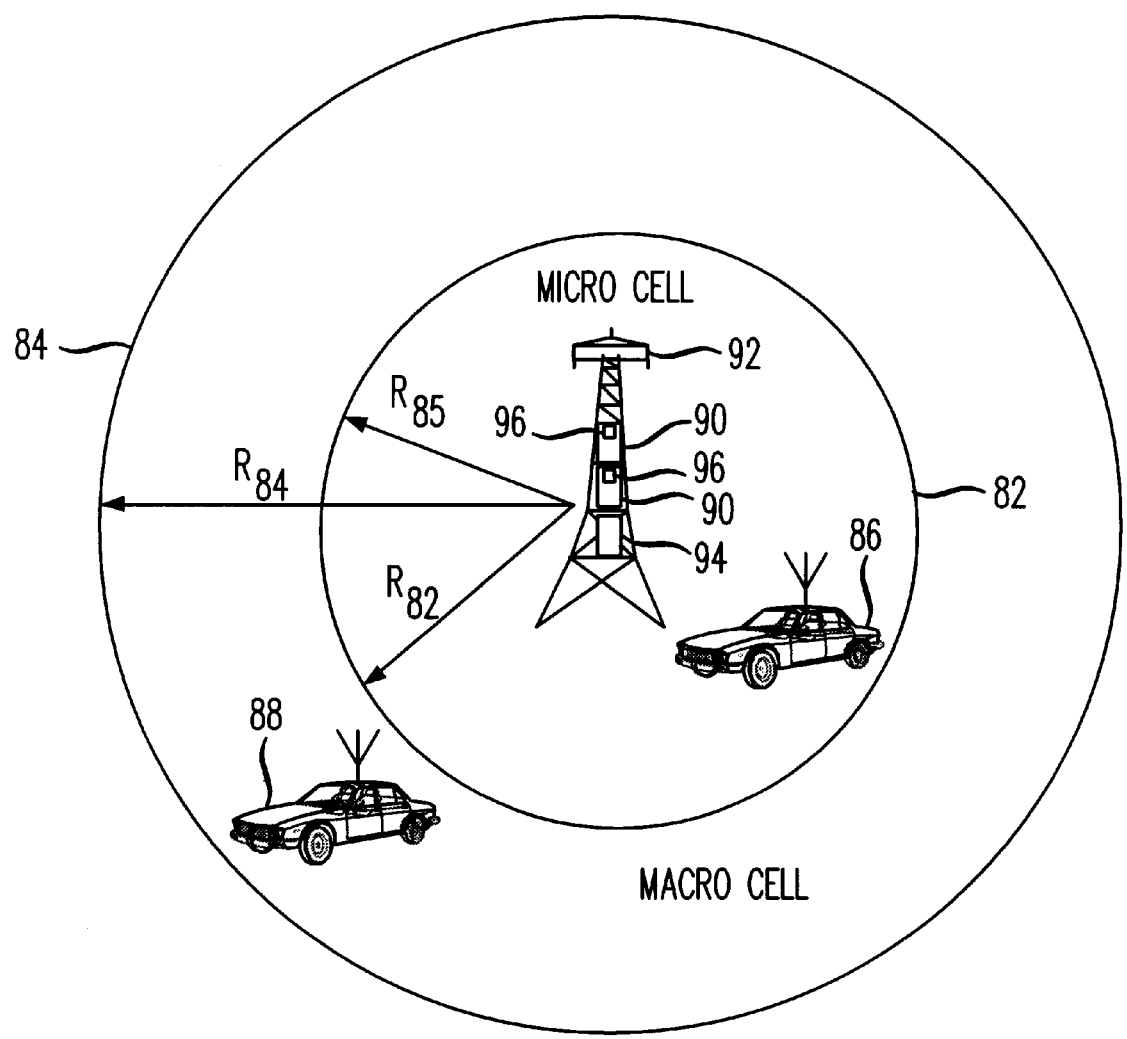
FIG. 8 depicts a base station having a hierarchical cell structure used in accordance with the present invention.

FIG. 8 depicts a base station 80 having a hierarchical cell structure used in accordance with the present invention. Base station 80 has associated a micro cell 82 and a macro cell 84. Micro cell 82 has a micro cell radius $R_{micro}$ or $R_{82}$, wherein micro cell radius $R_{micro}$ is less than or equal to a distance corresponding to the ASIC correlator bit limitation (e.g., $R_{micro} \leq 39$ miles). Macro cell 84 has an outer macro cell radius $R_{macro-outer}$ or $R_{84}$ and an inner macro cell radius $R_{macro-inner}$ or $R_{86}$, wherein inner macro cell radius $R_{macro-inner}$ is greater than zero and less than or equal to $R_{micro}$, and the difference $\Delta R$ between the macro cell radii $R_{macro-outer}$ and $R_{macro-inner}$ should be no greater than the distance corresponding to the ASIC correlator bit limitation (e.g., $\Delta R \leq 39$ miles for a 12 bit ASIC correlator). Although FIG. 8 shows micro cell 82 and macro cell 84 as two distinct cells, it should be understood that micro cell 82 and macro cell 84 may also partially overlap.

Base station 80 comprises a plurality of radios 90, one or more antennas 92 and a GPS receiver 94. Each of the plurality of radios 90 are operable to modulate and demodulate signals using a first frequency band $freq_1$ and/or a second frequency band $freq_2$, wherein the first frequency band $freq_1$ and the second frequency band $freq_2$ are different frequency bands, and frequency bands $freq_1$ and $freq_2$ each include uplink and downlink frequency channels. Each radio 90 includes a correlator 96 implemented in the form of an ASIC. Antennas 92 are operable to transmit and receive signals using the first frequency band $freq_1$ and/or the second frequency band $freq_2$. Base station 80 (or radios 90) is configured to transmit signals using frequency band $freq_1$ such that mobile-telephones located within micro cell 82 receives $freq_1$ pilot signals (i.e., pilot signals being transmitted using frequency band $freq_1$) with an acceptable signal strength and mobile-telephones located without micro cell 82 or within macro cell 84 do not receive $freq_1$ pilot signals with an acceptable signal strength.

Base station 80 provides wireless communications services to mobile-telephones, such as mobile-telephone 86, in micro cell 82 using the first frequency band $freq_1$ and a first timing protocol. The first timing protocol is, in one embodiment, the timing protocol currently being employed in IS-95 based CDMA wireless communications system, as described earlier in the Background section. Base station 80 provides wireless communications services to mobile-telephones, such as mobile-telephone 88, in macro cell 84 using the second frequency band $freq_2$ and a second timing protocol. The second timing protocol can be either of the aforementioned modified timing protocols of the present invention. For purposes of discussion, the present invention will be described herein with reference to the timing protocol depicted in FIG. 5.

Figure 9:
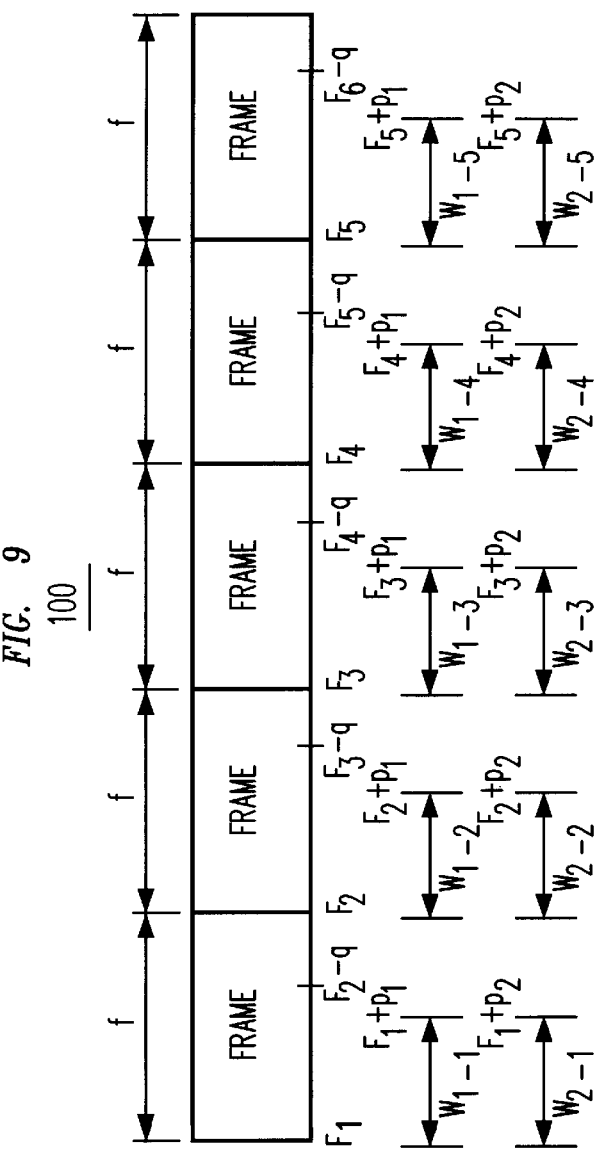
FIG. 9 depicts a timing schedule incorporating a first and a second timing protocol used by the base station of FIG. 8.

A timing schedule 100 for the first and second timing protocols is shown in FIG. 9. The timing schedule 100 includes a series of frames 102-$n$, wherein each frame 102-$n$ spans a time interval f, and the beginning of each frame 102-$n$ is marked by a frame boundary at time $F_n$ aligned with GPS time using the GPS receiver 94. In accordance with the first timing protocol, base station 80 is configured to begin transmitting base station signals using the first frequency band $freq_1$ at the frame boundaries, and search for mobile-telephone signals using the first frequency band $freq_1$ within first search windows $W_{1-n}$ spanning from time $F_n$ and ending no later than time $F_n+p_1$, wherein $p_1$ represents a time interval corresponding to a bit limitation for the first search windows or a correlator associated with the first search windows. By contrast, in accordance with the second timing protocol, base station 80 is configured to begin transmitting base station signals using the second frequency band $freq_2$ at time q before the frame boundaries, wherein the timing advance value q in this instance represent a propagation delay corresponding to a signal traveling no more than round trip from the base station and a distance $R_{macro-inner}$. Base station 80 would search for mobile-telephone signals using the second frequency band $freq_2$ within second search windows $W_{2-n}$ spanning from time $F_n$ and ending no later than time $F_n+p_2$, wherein $p_2$ represents a time interval corresponding to a bit limitation for the second search windows or a correlator associated with the second search windows.

It should be understood that base station 80 may use correlators with the same or different bit limitations for representing the round trip delay of a signal traveling to and from base station 80. For example, base station 80 may use a g-bit ASIC correlator in association with the first timing protocol, and a h-bit ASIC correlator in association with the second timing protocol, wherein g and h are non-zero positive integer values. In such a case, the search window for the g-bit ASIC correlator may span a duration $p_1$, whereas the search window for the h-bit ASIC correlator may span a duration $p_2$. It will be assumed, however, for ease of discussion that the ASIC correlators being used for the first and second search windows $W_{1-n}$, $W_{2-n}$ (depicted in FIG. 9) have the same bit limitations.

Mobile-telephones 86, 88 are configured to begin transmitting signals at some multiple x of a frame time interval (i.e.,fx) after the mobile-telephones began receiving base station signals, where x is some integer greater or equal to zero. Whether mobile-telephones 86, 88 use the first or second frequency band $freq_1$, $freq_2$ to transmit signals depend on whether mobile-telephones 86,88 are located. For example, since mobile-telephone 86 is depicted as being located in cell 82, mobile-telephone 86 will use frequency band $freq_1$ to transmit its signals. This would allow base station 80 to receive, within the confines of search windows $W_n$, signals transmitted by mobile-telephone 86 using frequency band $freq_1$.

To facilitate access operations with base station 80 (e.g., system access), mobile-telephones 86, 88 should be configured to first search for a $freq_1$ pilot signal. If mobile-telephones 86, 88 detect a $freq_1$ pilot signal with an acceptable signal strength (i.e., pilot signal strength=Rx pilot power/total Rx power$\geq$over some threshold level, such as −14 dB), then mobile-telephones 86, 88 will use frequency band $freq_1$ to communicate with base station 80 (or transmit its signals to base station 80). Otherwise mobile-telephones 86, 88 will search for a $freq_2$ pilot signal (i.e., a pilot signal being transmitted using frequency band $freq_2$), and upon detecting such pilot signal, mobile-telephones 86, 88 will use frequency band $freq_2$ to communicate with base station 80 (or transmit its signals to base station 80). This configuration will cause mobile-telephones 86, 88 to use frequency band $freq_1$, not frequency band $freq_2$, when they are located in micro cell 82. Likewise, this configuration will cause mobile-telephones 86, 88 to use frequency band freq$_2$, not frequency band freq$_1$, when they are located in macro cell 84.

Figure 10:
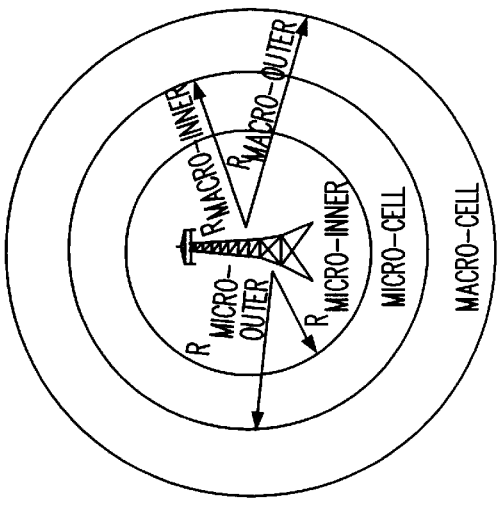
FIG. 10 depicts a base station with a micro cell and a macro cell, wherein the micro and macro cells both have an inner and an outer radius.

Although the present invention has been described in considerable detail with reference to certain embodiments, other versions are possible. For example, the present invention is also applicable to base stations with a micro cell and a macro cell having inner and outer radii, see FIG. 10, and wireless communication systems employing other types of multiple access techniques, such as time division multiple access. Therefore, the spirit and scope of the present invention should not be limited to the description of the embodiments.

We claim:

1. A method for detecting a mobile-telephone signal comprising the steps of:

transmitting a base station signal using a first frequency at a first frame boundary;

transmitting a base station signal using a second frequency at a time r relative to a second frame boundary;

receiving a mobile-telephone signal transmitted on the first frequency within a first search window beginning at a third frame boundary and ending at a time $p_1$ after the third frame boundary, wherein $p_1$ represents a time interval corresponding to a bit limitation for a first correlator; and receiving a mobile-telephone signal transmitted on the second frequency within a second search window beginning at a time q after a time r relative to a fourth frame boundary and ending at a time $q+p_2$ after the time r relative to the fourth frame boundary, wherein q is a timing advance value and $p_2$ represents a time interval corresponding to a bit limitation for a second correlator.

2. The method of claim 1 further comprising the step of:

detecting the mobile-telephone signal transmitted on the first frequency using a correlator.

3. The method of claim 2, wherein the mobile-telephone signal transmitted on the first frequency is detected when a resulting signal of an incoming signal multiplied with a known code exceeds a threshold.

4. The method of claim 3, wherein the known code is a pseudo-random noise sequence.

5. The method of claim 1 further comprising the step of:

detecting the mobile-telephone signal transmitted on the second frequency using a correlator.

6. The method of claim 5, wherein the mobile-telephone signal transmitted on the second frequency is detected when a resulting signal of an incoming signal multiplied with a known code exceeds a threshold.

7. The method of claim 6, wherein the known code is a pseudo-random noise sequence.

8. A base station comprising:

a first radio for transmitting base station signals using a first frequency at frame boundaries, the first radio having a first correlator for detecting mobile-telephone signals transmitted on the first frequency, the first correlator being configured to search for the first frequency mobile-telephone signals during first time intervals beginning at the frame boundaries and ending a time $p_1$ after the frame boundaries, wherein $p_1$ represents a time interval corresponding to a bit limitation for the first correlator; and a second radio for transmitting base station signals using a second frequency at a time r relative to the frame boundaries, the second radio having a second correlator for detecting mobile-telephone signals transmitted on the second frequency, the second correlator being configured to search for the second frequency mobile-telephone signals during second time intervals beginning at a time q after the time r and ending a time $q+p_2$ after the time r, wherein $p_2$ represents a time interval corresponding to a bit limitation for the second correlator.

9. The base station of claim 8, wherein the first correlator detects the first frequency mobile-telephone signals when a resulting signal of an incoming signal multiplied with a known code exceeds a threshold.

10. The base station of claim 8, wherein the second correlator detects the second frequency mobile-telephone signals when a resulting signal of an incoming signal multiplied with a known code exceeds a threshold.

11. The base station of claim 8 further comprising:

a GPS receiver for receiving timing information for aligning the frame boundaries.

* * * * *